United States Patent [19]
Lohrbach

[11] 3,757,396
[45] Sept. 11, 1973

[54] PRODUCTION APPARATUS FOR NUCLEAR REACTOR FUEL RODS

[75] Inventor: Werner Lohrbach, Erlangen, Germany

[73] Assignee: Siemens Aktiengesellschaft, Berlin, Germany

[22] Filed: Aug. 18, 1971

[21] Appl. No.: 172,659

[30] Foreign Application Priority Data
Aug. 19, 1970 Germany.................. P 20 41 089.3

[52] U.S. Cl. ............ 29/33 T, 214/1 BC, 214/1 BD
[51] Int. Cl....................... G21c 21/00, B23p 25/00
[58] Field of Search...................... 29/33 T; 264/0.5; 214/1 BC, 1 BD

[56] References Cited
UNITED STATES PATENTS
2,861,699   11/1958   Youmans.......................... 214/1 BD

*Primary Examiner*—Francis S. Husar
*Attorney*—Arthur E. Wilfond, Herbert L. Lerner et al.

[57] ABSTRACT

When machining, filling and cleansing casing tubes in the production of reactor fuel rods, the latter are disposed in a closed container and held therein in support tubes. Individual processing equipment is located at one face of the container while, at the other face thereof, a rotary shaft provided with grippers, drives for displacing the support tubes into the individual processing position and drives of clamping devices for the support tubes are provided. Consequently, only parts having a smooth surface and being relatively easy to decontaminate are present in the interior of the container.

5 Claims, 5 Drawing Figures

PRODUCTION APPARATUS FOR NUCLEAR REACTOR FUEL RODS

The invention relates to the production apparatus for nuclear reactor fuel rods.

Fuel rods for reactor cores are generally formed of relatively thin and long tubes in which radioactive material is inserted. A so-called fuel rod line serves automatically for inserting the radioactive material such as $PuO_2$-containing material, into the casing tubes, all production processes from the insertion of the pellets into the casing tube, through the cleansing of the casing tube until the latter is closed and transported away, are effected in the fuel rod line.

In order to be able to carry out all of these operations automatically and in order to maintain the surroundings of such a production apparatus free from poisonous and radiant material, the casing tubes are stored in a container having a helium atmosphere at underpressure, during the entire processing or machining of the casing tube ends. In order to insure the automatic production through all necessary operations, the casing tubes stored in a closed container must be brought successively into connection with the necessary processing or machining, filling and cleansing machines. One possibility of producing this connection is that after each operation, the respective casing tube is slid toward the next processing or machining position which is selected so that the next processing machine can act upon the end of the casing tube or the interior of the casing tube, as the case may be.

It is accordingly an object of the invention to provide production apparatus for fuel rods wherein several different processing machines for the casing tubes or fuel rods can be brought into connection with the ends of the casing tubes and wherein the casing tubes, during the entire production process, are located in a closed vessel in order to achieve a safe separation of highly poisonous radiant material from the surroundings.

With the foregoing and other objects in view, there is provided, in accordance with the invention, a production apparatus for fuel rods formed of casing tubes filled with radioactive material which includes processing, filling and cleansing machines for the casing tubes and a container for receiving the casing tubes that are to be filled, the container being sealed from the outside. The novel features of the invention are that the machines for processing the ends of the casing tubes are located above and adjacent one another in front of the face of the container, the casing tubes and the support tubes surrounding the same being fixable at least in each processing position of the casing tubes, and including rotary shafts mounted parallel to the casing tubes in the container and provided with grippers for displacing the casing tubes, the rotary shafts being disposed with the same spacing from at least two receiving positions of the casing tubes, respectively, and drives for the casing tubes being located outside the container in front of the face thereof located opposite the face at which the processing machines are located.

Other features which are considered as characteristic for the invention are set forth in the appended claims.

Although the invention is illustrated and described herein as embodied in production apparatus for nuclear reactor fuel rods, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawing, in which.

Figure 2:
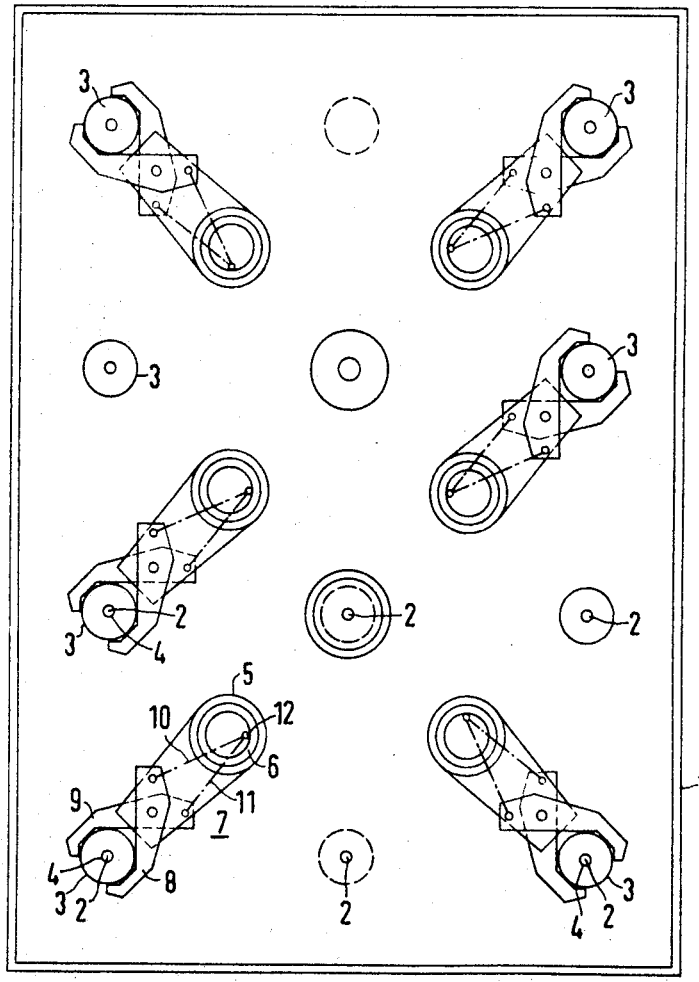
FIG. 2 is an enlarged sectional view of FIG. 1 taken along the line II—II in the direction of the arrows.

Referring now to the drawings and particularly at first to FIG. 2 thereof, there is shown a container 1, which is formed of four units similar to one another and disposed one on top of the other. In each of tiers formed thereby, a respective fixing receiving location 2 for support tubes 3 is located. Guide rollers, which are not illustrated in the drawing, are provided in the support tubes 3 for retaining centrally in the respective support tube 3 the casing tube 4 which is to be machined or processed. Grippers or clamps 7 are mounted on rotary shafts 5 and include actuating shafts 6 which are in turn mounted within the rotary shafts 5 so as to be rotatably movable.

Figure 1:
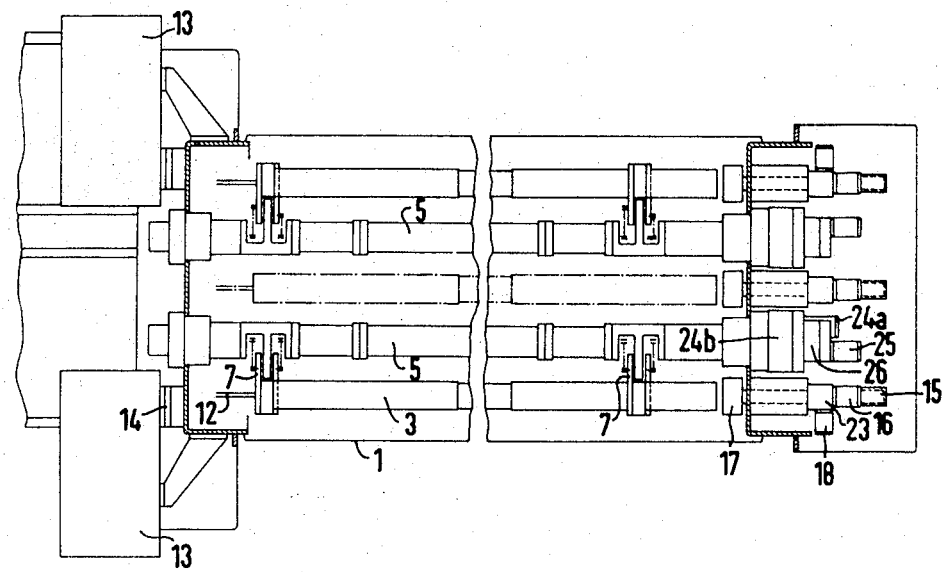
FIG. 1 is a top plan view of a production apparatus for fuel rods constructed in accordance with the invention.

In FIG. 1, the adjacent rotary shaft 5 of one tier and the support tubes 3 held by the grippers 7 are shown in plan view. It is readily apparent that only tubular parts having smooth surfaces are located in the interior of the container 1, the entire surface of the smooth tubular parts being readily accessible in the event of contamination by poisonous, radiant or radioactive materials such as $PuO_2$, for example, and can thus be readily decontaminated. The casing tubes 12 are held centrally in the support tubes 3.

At the end face of the container 1, shown at the left-hand side of FIG. 1, processing machines 13 for machining, filling and decontaminating the casing tubes 12 are located. They are connected through channels 14 provided by rotary slide valves with an opening in the end face of the container 1. At each receiving location, the support tube 3 can be inserted in a channel 14 by the end thereof shown at the left-hand side of FIG. 1. The displacing or shifting spindle 15, which can be shifted by drive motor 16 in axial direction either inwardly or outwardly serves to provide the foregoing shifting of the support tube 3 into the channel 14. The inner end of the shifting spindle 15 carries a coupling 17 which centers the support tube 3 at the receiving location 2. In addition, a further drive motor 18 is provided to permit rotary movement of the support tube 3 and, accordingly, of the casing tube 12 which is located therein.

Figure 3:
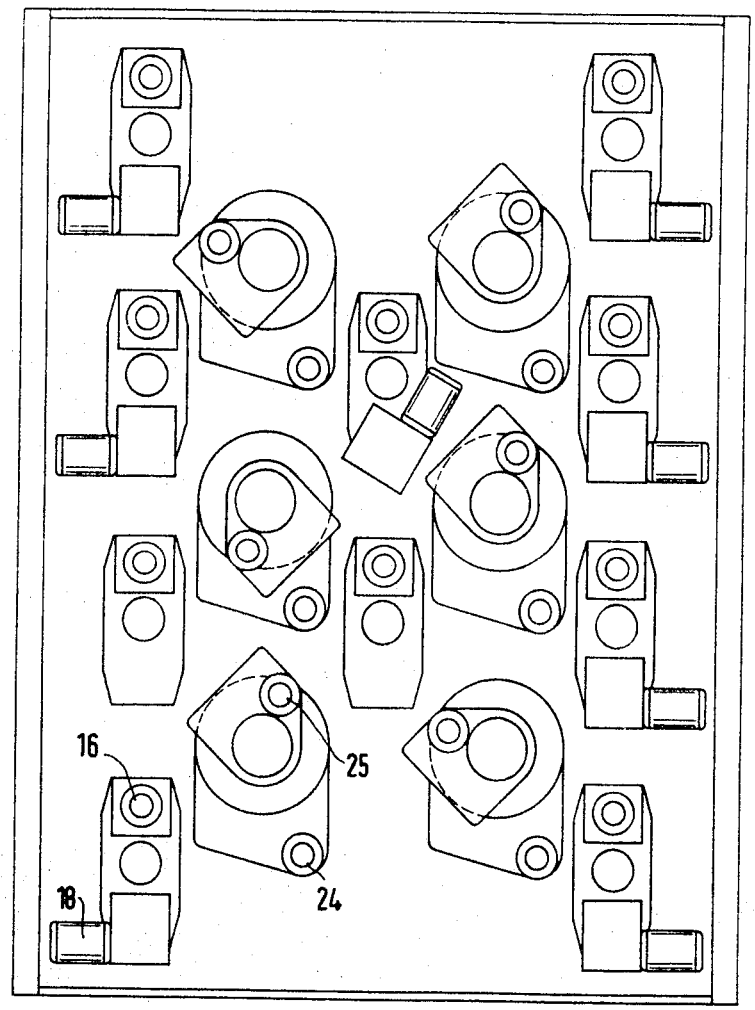
FIG. 3 is a right-hand side elevational view of FIG. 1 looking toward an end face of the container and the drives located thereat.

As is apparent in FIG. 3, a drive motor 18 for rotary movement is not coordinated with each processing or machining location since a drive motor is required only at those processing or machining locations at which a rotary movement of the casing tube is required, for example, during welding or decontamination.

Figure 4:
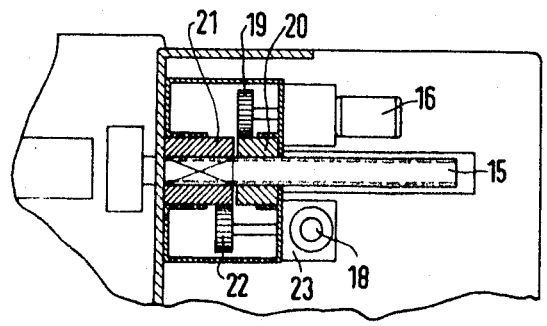
FIG. 4 is an enlarged fragmentary view, partly in section, of FIG. 1.

A view of the coupling between the shifting spindle 15 and the drive motors 16 and 18 is provided as a sectional detail in FIG. 4. The drive motor 16 drives a threaded nut 20 through a gear 19, the nut 20 being seated on an outer thread formed on the shifting spindle 15 and being mounted so as to be only rotatable and not laterally displaceable. The shifting spindle 15 is provided with a flattened surface, respectively, at the opposite peripheral side thereof along the entire length thereof so that it is form-lockingly connected to an additional nut 21 which also possesses flattened surfaces at opposite sides thereof. The nut 21 is connected to the drive motor 18 through a gear 22 and a worm drive 23 which is not shown in detail in FIG. 4. Rotation of the drive motor 18 causes rotation of the nut 21 and therewith rotation of the shifting spindle 15 while, when the nut 20 is rotated through the gear 19, the self-obstructing worm drive 23 prevents the nut 21 from rotating therewith so that the shifting spindle 15, depending upon the direction of rotation of the nut 20, is displaced axially either into the interior of the container 1 or out of the same. Two additional motors 24 and 25 serve for driving the rotor shaft 5 and the actuating shaft 6 located therewithin. The motor 24a is connected with the rotary shaft 5 through a transmission 24b, shown in FIG. 1 though not in detail, and assures rotation of this rotary shaft 5 independently of the rotary direction thereof. The motor 25 is connected with the actuating shaft 6 in the interior of the rotary shaft 5 through a worm drive 25, which is of self-obstructing construction as the worm drive 23 and is seated on the rotary shaft 5, so that when the motor 24 is rotated and the rotary shaft is rotated in conjunction therewith, the actuating shaft mounted in the interior of the rotary shaft 5 also rotates therewith. Relative motion between the rotary shaft 5 and the actuating shaft 6 is thus able to be achieved only by actuating the motor 25. Accordingly the rotary shaft 5, as well as the circular movement of the gripper 7 can be controlled separately from one another.

Figure 5:
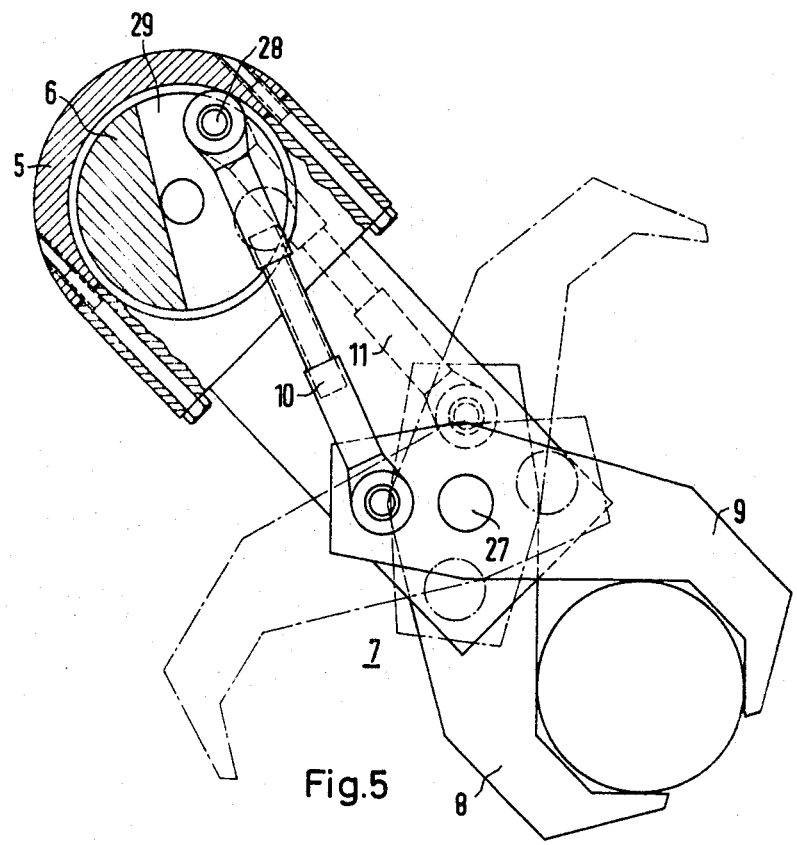
FIG. 5 is a fragmentary enlarged view, partly in section, of FIG. 2.

The structure of an embodiment of the gripper 7 is shown in FIG. 5. The gripper 7 has two grip arms 8 and 9 at the outer end thereof, which are mounted on a common rotary axis 27. Each of the gripper arms 8 and 9 is connected through a linkage 10 and 11, respectively, with a pin 28 which is mounted eccentrically on the actuating shaft 6. The end of the linkages 10 and 11 facing the pin 28 is displaced in a groove-shaped recess 29 formed in the actuating shaft 6. The forces applied to the gripper arms 8 and 9 in the closed condition thereof are transformed thus into tension and compression forces on the linkages 10 and 11 so that a movement of the gripper arms 8 and 9 can be effected only when relative motion between the actuating shaft 6 and the rotary shaft 5 occurs. Since both shafts are connected to one another through a self-obstructing transmission, assurance is provided that no inadvertent gripping or clamping movement can be carried out by the gripper arms 8 and 9. The support member of the grippers 7 is firmly connected to the rotary shaft 5 that is open on one side at the location of the gripper 7. The linkages 10 and 11 are assembled of threaded and casing or sleeve members so that the length thereof can be adjusted. The length of th linkage 10 and 11 is adjusted so that the tube 3 held in the gripper arms 8 and 9 can be rotated and displaced in axial direction even when the gripper arms 8 and 9 are closed.

It is claimed:

1. Production apparatus for nuclear fuel rods formed of casing tubes fillable with radioactive material comprising machines for machining, filling and cleansing the casing tubes, and a container, sealed from the outside, support tubes mounted in said container for receiving therewithin the casing tubes to be filled, said machines being located above and adjacent one another outside said container at one end face thereof, said support tubes and the casing tubes received therein being fixable in a selective machining position of the casing tubes, rotary shafts mounted parallel to the casing tubes in said container and provided with grippers for displacing the casing tubes, said rotary shafts being located with the same spacing from at least two receiving positions of the casing tubes, respectively, and drives for the casing tubes located outside said container at an end face thereof located opposite said one end face at which said machines are located.

2. Production apparatus according to claim 1, including an activating shaft for a respective gripper located in the interior of each of said rotary shafts, said gripper having a pair of pivotal gripper arms and linkage means connected, on the one hand, to said gripper arms and, on the other hand, to said actuating shaft for actuating said gripper.

3. Production apparatus according to claim 1 wherein a respective additional receiving position of the casing tubes is located between two adjacent machining positions, respectively, and including a removal device located at an end face of said container in front of said additional receiving position.

4. Production apparatus according to claim 1 including shifting spindles at the end face of said container at which the drive motors for said rotary shafts are located, and at the receiving locations, and drive motors for axially displacing the shifting spindle into the interior of said container, said shifting spindles having couplings at the ends thereof located within said container.

5. Production apparatus according to claim 2 including a self-obstructing transmission located between said rotary and actuating shafts.

* * * * *